Figures 1, 2:
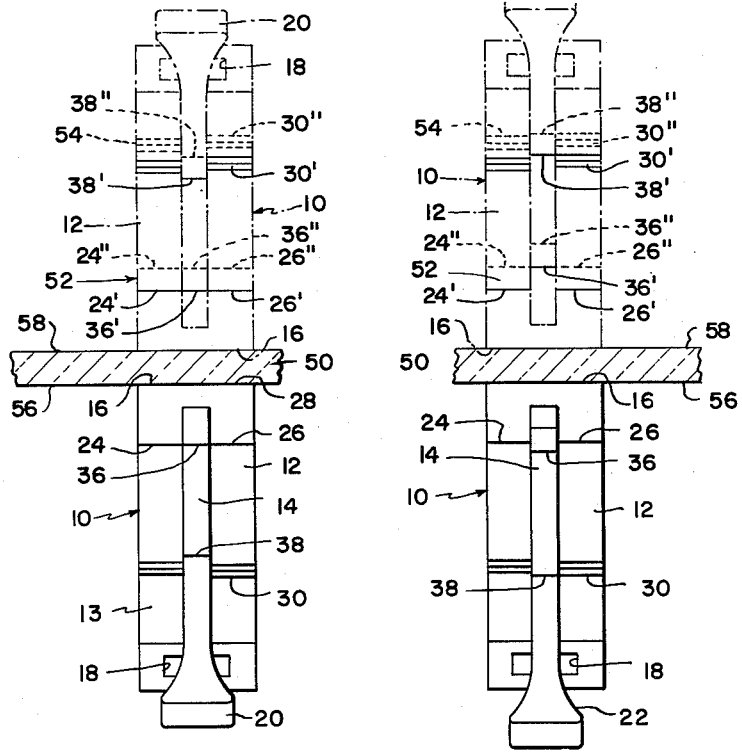

June 28, 1966   W. F. GARRAWAY   3,257,895
THICKNESS MEASURING INSTRUMENT

Filed Nov. 20, 1961   3 Sheets-Sheet 1

INVENTOR
WILLIAM F. GARRAWAY
BY
Fetherstonhaugh & Co.
ATTORNEYS

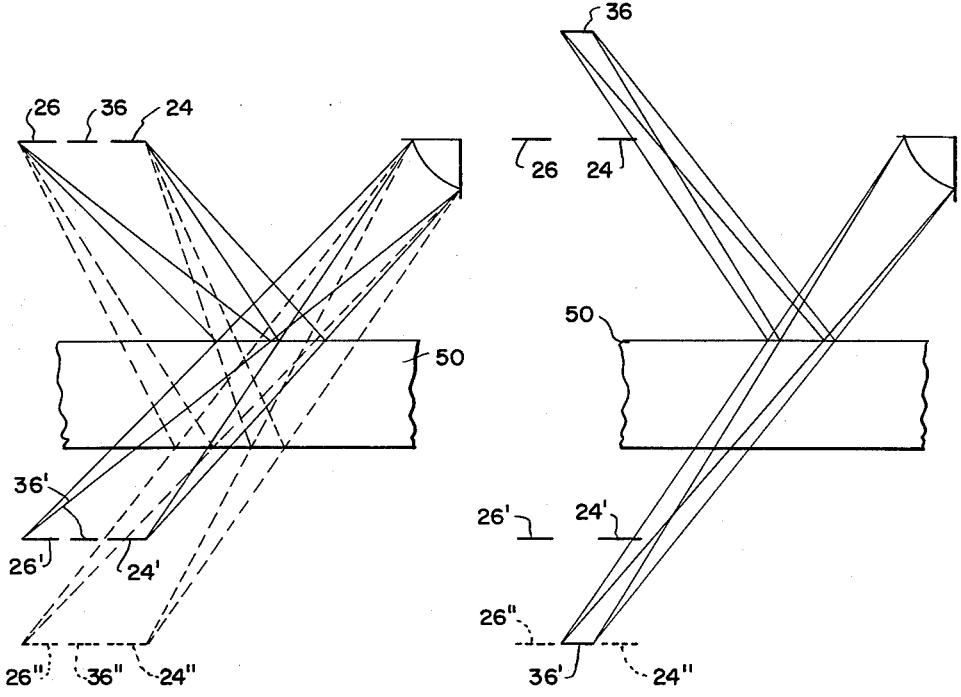

June 28, 1966  W. F. GARRAWAY  3,257,895
THICKNESS MEASURING INSTRUMENT
Filed Nov. 20, 1961  3 Sheets-Sheet 3
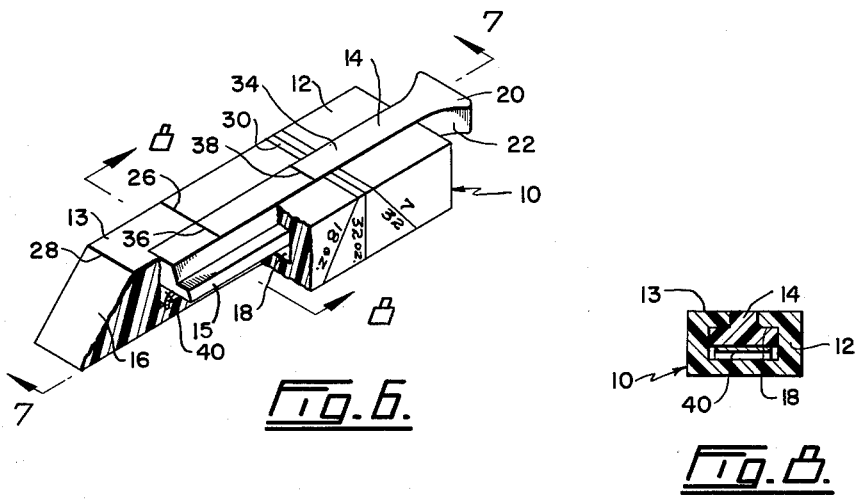
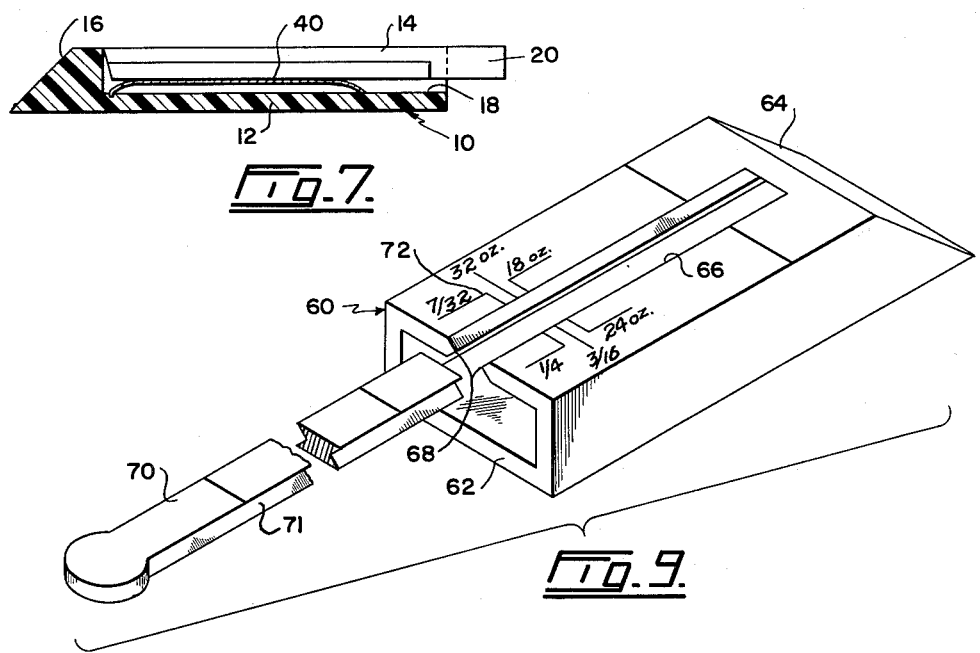
INVENTOR
WILLIAM F. GARRAWAY
BY
Fetherstonhaugh & Co.
ATTORNEYS United States Patent Office 3,257,895
Patented June 28, 1966

3,257,895
THICKNESS MEASURING INSTRUMENT
William F. Garraway, 2728 Shelbourne St., Victoria,
British Columbia, Canada
Filed Nov. 20, 1961, Ser. No. 153,396
6 Claims. (Cl. 88—14)

This invention relates to a thickness measuring instrument and in particular to an instrument or gauge for measuring the thickness of sheets of glass or other transparent material.

In many situations it is desirable to be able to measure the thickness of a sheet of glass and one of the most obvious and commonly used methods of so doing heretofore has been to utilize a pair of calipers or similar measuring instruments. This method is, however, only possible when one has simultaneous access to both sides of the sheet to be measured as, for example, in measuring a sheet of glass in a sash-type window. This prior art method using calipers is rather a cumbersome procedure, however, and the calipers and associated measuring devices are somewhat expensive. Furthermore, it is clear that it would be impossible to use a caliper method for measuring the thickness of sheet glass in a picture-type window installation and in many other similar and commonly encountered applications. A variety of other instruments and methods of measuring the thickness of glass or other transparent material have been proposed in the prior art, but most of these prior art devices are expensive instruments and since they entail a rather complicated procedure in order to obtain the desired measurements, a good deal of care and skill is required to be exercised by the user.

A thickness measuring gauge for sheets of glass or other transparent material according to the present invention makes use of the principle of light reflections from both sides of the sheet and, in use, the user looks through the sheet itself to a reflection of the gauge and adjusts the gauge to obtain an accurate reading of the desired thickness in a simple and expeditious manner. The gauge is provided with a series of lines and upon looking through the sheet of glass or other transparent material being measured, a pair of virtual images of these lines produced by the back and front faces of the sheet is seen. The pair of images are separated by a distance corresponding to the thickness of the material being measured and a measure of this thickness is obtained by adjusting the gauge to make the image of one of the lines produced by the front face of the sheet coincide with the image of one or more of the other lines produced by the back face of the sheet, the gauge is being calibrated to indicate the amount of this adjustment which is directly proportional to the thickness of the glass.

Objects of the present invention are to provide a device for measuring the thickness of glass or other transparent material which is of extremely simple, inexpensive and compact construction, which enables rapid and accurate measurements to be made even by an unskilled operator, and which requires no servicing or calibration during use.

A still further object of the invention is to provide a thickness measuring device which enables accurate measurements to be made of the thickness of sheet glass or other transparent material by merely applying the gauge against one side of the sheet.

In accordance with these objects, the present invention provides a device for measuring the thickness of glass or other transparent material which comprises an elongated stock, a slide member mounted on said stock for relative longitudinal movement axially thereof, gauge lines on said stock and said slide normally aligned with each other, a calibrated scale on said stock and indicating means on said slide adapted to co-operate with said scale to provide an indication of the movement of said slide relative to said stock.

A method of measuring the thickness of glass or other transparent material according to this invention comprises positioning a gauge member provided with two or more gauge lines against one face of said glass, adjusting the position of one of said lines relative to the other line to bring the virtual image of said one line produced by one face of said glass into alignment with the virtual image of the other line produced by the other face of said glass, and measuring the displacement of said one line relative to said other line necessary to bring said virtual images into coincidence, said relative displacement providing a direct indication of the thickness of said glass.

Other features which may be included in accordance with the invention will be described hereinafter and referred to in the appended claims.

Figure 3:
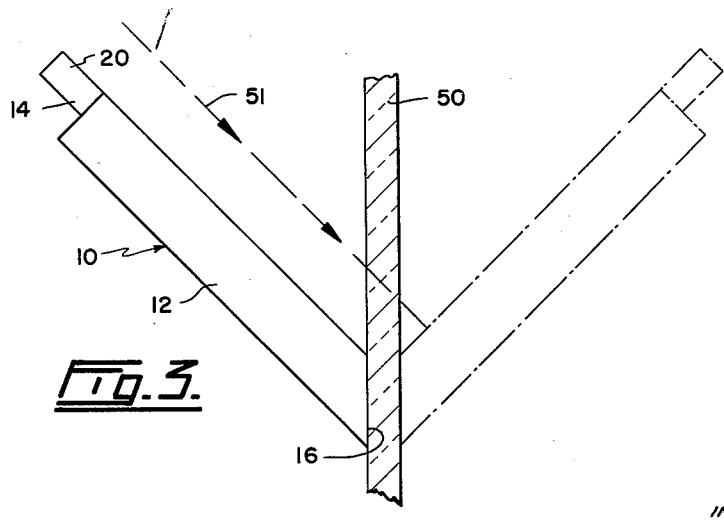

The invention will now be more particularly described in connection with the accompanying drawings which show exemplary embodiments of the invention, and in which, FIGURES 1 and 2 are perspective views of the device according to this invention, showing the two position operation in measuring the thickness of a sheet of glass or other transparent material, FIGURE 3 is a side elevational view showing the manner of using the device for measuring the thickness of a sheet of glass, FIGURES 4 and 5 are schematic views corresponding to FIGURES 1 and 2 respectively and showing the paths of the light rays and the image creating mechanism, FIGURE 6 is an isometric view partly in section of the device according to this invention, FIGURE 7 is a sectional view taken on the line 7—7 of FIGURE 6, FIGURE 8 is a cross sectional view taken on the line 8—8 of FIGURE 6, and FIGURE 9 is an exploded view of an alternative embodiment of the invention.

Referring to the drawings, the gauge generally designated 10 includes an elongated stock or body 12 and a slide member 14, said slide member having webs 15 projecting laterally therefrom. The stock or body 12 is formed at one end with a bevelled face 16 adapted to be placed against one face of the material, the thickness of which it is desired to measure. The bevelled face 16 is preferably inclined rearwardly at an angle of 45 degrees to the longitudinal axis of the stock. A slot 18 of generally inverted T-shaped cross section extends longitudinally of the stock co-axial therewith. The slide member 14 is of generally inverted T-shaped cross section and is adapted to be received in the slot 18 for sliding movement longitudinally thereof. The slide member 14 is provided at its outer end with an extension or handle 20 having grooved side wall or top and bottom sections 22 which form convenient gripping means to facilitate movement of the slide member relative to the stock.

The stock 12 is provided on its upper face 13 with a pair of aligned gauge lines 24 and 26 spaced inwardly from the upper edge 28 of the bevelled front face 16 thereof and disposed on opposite sides of the slot 18. A series of spaced scale lines 30 are inscribed on the upper face of stock 12 adjacent the other end thereof and on opposite sides of slot 18, these scale lines being graduated to provide direct readings as to the thickness of the material to be measured.

The upper face 34 of slide member 14 is provided with a gauge line 36 spaced inwardly from the leading edge thereof, line 36, when the slide member 14 is fully telescoped into stock 12, being aligned with the gauge lines 24 and 26 on the stock. An indicator line 38 is scribed on the upper face of slide member 14 and spaced from gauge line 36 for the purpose which will appear hereinafter. Preferably, gauge lines 24, 36 and 26 are spaced inwardly from the edge 28 of the front bevelled face 16 of stop 12 by about one-half inch, in order to avoid confusion in use between images of the edge 28 and the gauge lines when the device is used.

A strip 40 of resilient and somewhat spring material, such as spring steel, is disposed in slot 18 and extends along the bottom thereof. Strip 40 is preferably curved longitudinally thereof and is positioned in slot 18 with its convex surface uppermost. The slide member 14 is fitted into slot 18 over strip 40 and the latter is effective to urge the webs 14 of slide member 14 into frictional engagement with the shoulders of slot 18 to hold the slide member against movement through slot 18 relative to stock 12 and ensures that when the slide member is set in any position, it will be held in the assigned position until positively displaced therefrom.

The stock and slide member may be made of any suitable material, such as wood or metal, but in practice it has been found desirable to make these members of a suitable plastic material, such as that marketed under the trade name butyrate, and preferably of color white which has been found to have the best reflective properties for effective use of the gauge. The gauge lines 24, 26 and 36, indicator line 38 and scale lines 30 may be engraved or embossed on their associated members, or they may consist of notches cut in the upper surfaces of these members.

In calibrating this device initially, gauge lines 24 and 26 and gauge line 36 and indicator line 38 are marked on stock 12 and slide member 36 respectively. The device is then held with its bevelled front face 16 against one surface of a sheet of glass, such as 50, the thickness of which is known. On looking through sheet 50, two sets of virtual images 24′–36′–26′ and 24″–36″–26″ formed by opposite faces of the sheet are seen, see FIGURE 1. Thereafter, slide member 14 is retracted from slot 18 through a distance sufficient to move image line 36′ into alignment with image lines 24″ and 26″, as shown in FIGURE 2. With the gauge in this set position, a scale line 30 is marked on the upper surface of stock 12 on one side of slot 18 and opposite indicator line 38. This scale line corresponds to the known thickness of the sleet and is marked accordingly. The foregoing procedure is then repeated with sheets of various standard thicknesses and a series of corresponding scale lines 30 marked on opposite sides of slot 18 is obtained to provide the desired calibrated scale.

In using this device to measure the thickness of a sheet of glass, such as 50, the bevelled front face 16 thereof is placed against one surface of the sheet as shown particularly in FIGURES 1 and 2. For best results, the normal user should stand about 9 to 12 inches back from the sheet and should preferably place the device against the sheet at slightly above waist lever whenever it is possible to do so. With the device positioned in this manner and with slide member 14 fully telescoped within stock 12, as shown in FIGURE 1, the user upon looking through the sheet 50 with his line of sight 51 substantially parallel to the gauge, sees a pair of images of the device. These images 52 and 54 which are virtual images and appear to the eye to emanate from the other side of the sheet, are formed by reflections from the front 56 and back 58 surfaces of sheet 50 respectively. Aligned image lines 24′–26′–36′ and 24″–26″–36″– are virtual images of the lines 24–26–36 formed respectively by the front 56, and back 58 faces of sheet 50. The relative displacement of the two sets of virtual images is directly proportional to the thickness of the material in sheet 50. A measure of this relative displacement and consequent of the thickness of the sheet 50 is then readily obtained by grasping hand handle 20 and with drawing slide member 14 through slot 18 a distance sufficient to bring the virtual image 36′ of line 36 formed by the front face of sheet 50 into alignment with the virtual images 24″ and 26″ of lines 24 and 26 formed by the back face of sheet 50. Upon suitable retraction of slide member 14 to effect this alignment of image line 36′ with image line 24″–26″, the relative displacement of these images and thus the thickness of sheet 50 may be read on scale 30 and is given by the scale marking appearing opposite indicator line 38.

A further embodiment of the invention is shown in FIGURE 9. In this form of the invention, the gauge generally designated 60 consists of a hollow molded stock 62 formed with a bevelled front face 64 inclined rearwardly at approximately 45° to the axis of the stock. A slot 66 extends longitudinally of the top face of stock 62 and the sides of the slot are shaped to form knife edge bearing surfaces 68. The slide member 70 is provided with V-shaped grooves 71 in its longitudinal edges, said grooves adapted to engage and slide over the bearing surfaces 68. The stock and slide member are preferably formed of a resilient plastic material and the tension in the material on either side of slot 66 is effective to offer a degree of resistance to movement of the slider through the slot and also serves to maintain the slide member in any position to which it has been set. Also in this form of the invention the scale lines 72 and associated markings are all inscribed on the top face of the stock.

The device according to this invention although normally depending on natural light for the reflections is equally suitable for use with artificial light and tests have proven that the thickness of sheets of glass or the like can be measured in artificial light with the same or better results as obtained with natural light. If desired, a suitable open sighting device similar to that commonly employed in cameras could be provided thereby facilitating the use of the device. This sighting device could be formed as an integral part of the gauge or as a separate unit for attachment thereto.

What I claim as my invention is:

1. A device for measuring the thickness of a sheet of glass or other transparent material having spaced co-extensive first and second surfaces, comprising an elongated stock having an end to be placed against the first surface of a transparent sheet, said stock end being bevelled so that when said end is placed against a sheet surface the stock is inclined relative to said sheet, a slide member mounted on the stock for movement longitudinally thereof towards and away from said end, gauge lines on the stock and the slide member normally aligned with each other, said gauge lines being positioned to produce two spaced-apart virtual images thereof formed by reflections on the first and second surfaces of said sheet when said bevelled stock end is placed against said first surface and the stock is inclined away therefrom in a longitudinal direction, the distance between the two virtual images being proportional to the thickness of the sheet, a scale on the stock extending longitudinally thereof near the slide member, and indicating means on the slide member at said scale to provide an indication of the movement of said member relative to the stock, said scale being calibrated relative to the bevel of said stock end to indicate the thickness of said sheet when the slide member is moved so as to shift one virtual image of the member guide line from its normal position in line with one virtual image of the stock guide line into alignment with the other virtual image of said stock line.

2. A measuring device as claimed in claim 1 including means to resist movement of said slide member relative to said stock and to retain said slide member in any position to which it is set.

3. A measuring device as claimed in claim 1 in which said scale comprises a series of lines, each calibrated to represent a specified thickness or weight of the sheet to be measured, and said indicating means comprises a marker line on said slide member spaced longitudinally of said member relative to said slide gauge lines.

4. A measuring device as claimed in claim 1 in which said slide member is provided at its outer end with means for moving the slide member relative to the stock.

5. A device for measuring the thickness of a sheet of glass or other transparent material having spaced co-extensive first and second surfaces, comprising a hollow elongated casing having an end to be placed against a first surface of a transparent sheet, said casing end being bevelled so that when said end is placed against a sheet surface the casing is inclined relative to said sheet, said casing having a slot extending longitudinally in a top thereof, a slide member mounted in said slot for movement longitudinally of the casing towards and away from said end, gauge lines on the casing and the slide member normally aligned with each other, said gauge lines being positioned to produce two spaced-apart virtual images thereof formed by reflections on the first and second surfaces of said sheet when said casing bevelled end is placed against said first surface and the casing is inclined away therefrom in a longitudinal direction, the distance between the two virtual images being proportional to the thickness of the sheet, a scale on the casing extending longitudinally thereof near the slide member, and indicating means on the slide member at said scale to provide an indication of the movement of said member relative to the casing, said scale being calibrated relative to the bevel of said casing end to indicate the thickness of said sheet when the slide member is moved so as to shift one virtual image of the member guide line from its normal position in line with one virtual image of the casing guide line into alignment with the other virtual image of said casing line.

6. A measuring device as claimed in claim 5 wherein opposed longitudinal walls of said slot in the casing are formed with knife edge bearing surfaces and said slide member is formed with grooved longitudinal edges for slidable engagement with said bearing surfaces.

References Cited by the Examiner

UNITED STATES PATENTS

| | | | |
|---|---|---|---|
| 878,439 | 2/1908 | Wagniere | 33—143 X |
| 3,037,291 | 6/1962 | Speer | 33—143 |

FOREIGN PATENTS

| | | |
|---|---|---|
| 562,204 | 11/1957 | Belgium. |
| 850,564 | 10/1960 | Great Britain. |
| 112,123 | 10/1944 | Sweden. |

JEWELL H. PEDERSEN, *Primary Examiner.*

T. L. HUDSON, *Assistant Examiner.*